Feb. 12, 1946.  J. G. DE FLON  2,394,755
AIR DISTRIBUTION IN MECHANICAL DRAFT TOWERS
Filed Feb. 13, 1943

INVENTOR.
JAMES G. DE FLON
BY H. Calvin White
Attorney

Patented Feb. 12, 1946

2,394,755

UNITED STATES PATENT OFFICE 2,394,755

AIR DISTRIBUTION IN MECHANICAL DRAFT TOWERS

James G. De Flon, Los Angeles, Calif., assignor to The Fluor Corporation, Ltd., Los Angeles, Calif., a corporation of California Application February 13, 1943, Serial No. 475,711

4 Claims. (Cl. 261—109)

This invention has for its principal object to improve the performance of induced draft water cooling towers and to effect substantial economies in their cost and operation. Cooling towers of the induced draft type are characterized in that water to be cooled is passed downwardly within a walled chamber in intimate exposure to an air stream induced or drawn upwardly by a fan at the top of the chamber. It will be understood that various features of the invention are applicable to either the single or double air inlet types of induced draft towers, i. e. those in which air is drawn into the cooling chamber through a bottom inlet at one side only of the chamber, or through inlets in opposite sides of the chamber.

The invention is aimed primarily at overcoming defective conditions of air flow that have been found to exist in the conventional induced draft cooling towers, and which have materially limited the efficiency of such towers below their potential performance. Extensive tests have revealed that in for example double inlet towers, the fan draft creates within a rectangular transverse section cooling chamber, a region of high air velocity extending upwardly within the central portion of the tower, and that approaching the side walls of the chamber the air velocity may reach negligible proportions, or even assume a negative character in the form of downwardly eddying currents. In single inlet induced draft towers, the tendency has been for the preponderance of air flow to occur disproportionately within one side of the chamber, leaving the condition of air flow toward the opposite side similar, though to a greater degree, to that existing in the double inlet type as indicated above. Under such conditions in both types of towers, loss of potential efficiencies results from inability to take full advantage of the water cooling capacity of the air. Excessive air flow occurs in some sections of the cooling chamber, and inadequate air flow exists in other sections. Consequently the temperatures of the air leaving (rising above) different sections of the chamber filling, may vary widely; some of the air may not have become saturated, while other parts of the air may have reached saturation well in advance of final passage through the filling.

It is now proposed to correct such conditions of air flow by distributing the air across the transverse area of the cooling chamber in a manner resulting in substantially uniform cooling of the water in all sections of the chamber and substantial uniformity in the temperature reduction of the air flowing through those sections. Water given uniform distribution within the upper interior of the chamber contacts rising air of uniform cooling effectiveness, the conditions thus established tending to give maximum total water cooling and most efficient operation for a cooling chamber of given size.

In accordance with the invention, a system of air directive baffles is placed in the lower portion of the chamber opposite the air inlet or inlets, the baffles being disposed in arrangements causing the total entering air to be divided and diverted in upwardly directed portions distributed across the transverse area of the chamber in a manner productive of uniform cooling as discussed above. In this connection, the invention particularly contemplates the use of horizontally extended baffles for conducting air into the inner zones of the cooling chamber to secure an initial distribution of air from the inlet or inlets across the lower portion of the chamber, in quantities causing the water where thence directed upwardly through the chamber, to effect substantially uniform water cooling in all sections of the chamber. As will later appear, the desired end result is accomplished primarily by securing an initial distribution of the entering air in quantities increasing as the path of flow or resistance to air flow increases within different interior sections of the cooling chamber.

Another advantage of the baffle arrangement is that it may provide substantial water cooling surface area within portions of the chamber ordinarily lacking decks or other water filming surfaces, thus giving the tower added cooling capacity and frequently permitting reduction of the tower height and water pumping head.

Reference is had to the accompanying drawing for a more complete explanation of the aforementioned and other objects and features of the invention, as well as the details of certain typical embodiments thereof. In the drawing:

Fig. 4 is a fragmentary section showing a contemplated baffle or deck arrangement at the air inlet.

Figure 1:
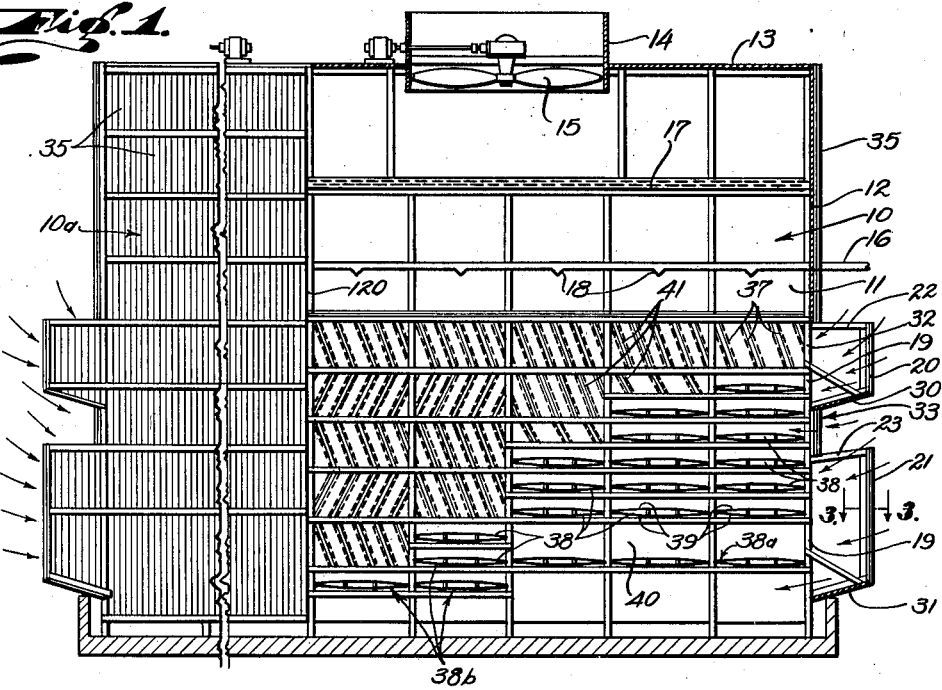
Fig. 1 is an elevation, partly in transverse section, showing one embodiment of the invention in an induced draft tower.

In each of the illustrated towers, oppositely flowing water and air are brought into intimate contact within cooling chambers each constituting a section or bay of the entire tower which may include, in accordance with the total cooling to be effected, one or a number of individual chambers 10 separated by transverse partitions or walls 11. Each chamber is enclosed at its sides above the air inlets by continuous walls 12 and at the top by a horizontal wall 13 having a central opening containing the fan ring 14 and the motor-driven fan 15. Water to be cooled is introduced to the chamber through a header 16 below the usual mist eliminators or baffles 17, and is sprayed from nozzles 18 downwardly over the tower filling, variously termed decks, or baffles, and presenting surfaces of large area over which the water is filmed and thereby intimately exposed to the rising air streams.

The form of the invention shown in Fig. 1 represents a tower of comparatively great width, and into which air is drawn through opposed inlets 19 in the lower portions of the side walls 12. The inner end of the chamber shown in cross-section may be regarded as terminating at column 120, in back-to-back relation with another similar chamber 10a within the left side of the tower shown in end elevation. The two chambers preferably are closed by a vertical solid wall at 120, in which event each of the chambers 10 and 10a becomes a single air inlet type, receiving air through the inlet 19 at one side only. It will be understood that chamber 10a may have the same arrangement of baffles, decks and fan at the top, as chamber 10.

A major problem presented by reason of the width of the chamber, and particularly where the air enters at one side only, is in securing such distribution of air across the entire chamber as to produce uniform cooling conditions, and to cause the air rising within all transverse sections or areas of the chamber to become cooled to substantially the same temperature upon leaving the filling or decks. The invention contemplates three improved features individually and collectively contributing to proper air distribution: one of these features being the use of an offset fan arrangement; the second, a baffle arrangement outside the air inlet causing the entering air to assume a downward course of flow sweeping across the chamber; and the third, a novel interior baffle or deck arrangement directing and distributing the air in proportions, with relation to the several sections of the chamber, required for most efficient water cooling.

With reference to the first of these features, i. e. the fan arrangement, it will be observed that the fan 15 and ring 14 assembly is offset a substantial distance inwardly or toward the left of the transverse center of the chamber. The normal tendency of the fan is to draw the air upwardly from the inlet 19 more or less directly to the outlet formed by the fan ring 14, and in so doing to cause the air, or at least the quantities required for proper cooling, to "by-pass" the lower and innermost portions of the chamber toward its inner end 120. This is particularly true where the resistance to air flow through the longer path leading from the inlet to the opposite side of the chamber and then upwardly to the fan outlet, is further increased by the presence of filling or decks within the chamber. By offsetting the fan, substantially as illustrated, toward the inner side of the chamber, the induced air flow is correspondently shifted within the chamber and greater air distribution results within the lower and innermost sections of the chamber.

Figure 3:
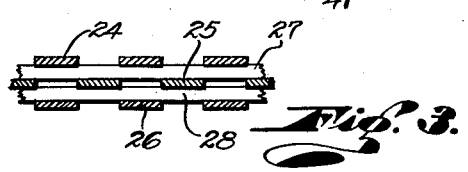
Fig. 3 is a fragmentary enlarged section on line 3—3 of Fig. 1 showing the air inlet baffle construction.

The second mentioned feature, namely that of causing the air to be drawn downwardly and inwardly through the inlet 19, is accomplished by placing at the outside of the inlet an apertured baffle arrangement mounted in spaced relation to the plane of the chamber side wall and air inlet. Preferably, though typically, the outside baffle means comprises vertically spaced, apertured baffle assemblies 20 and 21 which cause the air to enter the inlet in downwardly and inwardly directed paths of flow through the spaces 22 and 23 as well as through the baffles. Each of the baffles may be made in the form of rows 24, 25 and 26 of offset slats or battens separated by spacers 27 and 28, see Fig. 3. The lower ends of the baffle assemblies terminate at inclined drip panels 30 and 31 extending inwardly to the usual frame columns 32. A baffle assembly 33, similar to that illustrated in Fig. 3, is placed in the space between baffles 20 and 21 adjacent the side of the cooling chamber.

Air entering the chamber is caused by the outside baffles to take a downward and inward course of flow, one effect of which is to move the air in a path sweeping further into and across the chamber against the tendency of the fan to cause the air to rise more abruptly. Thus, for example, at the bottom of the chamber, a greater proportion of the air in this manner is caused to flow from the inlet across to the extreme opposite side of the chamber, than would normally be the case, in the absence of such initial air direction. Another advantage of the baffles 20 and 21 is that they prevent disturbances of proper air flow conditions in the cooling chamber, and loss of water from the tower, by shielding the inlets 19 against the effects of high velocity atmospheric wind currents directed against the sides of the tower.

As previously indicated, the cooling chamber wall 12 is continuous above the air inlets. For purposes explained in Patent No. 2,194,711, issued March 26, 1940, to George W. Meyer et al. on Cooling tower, it may be desirable to apply to the wall surface and to the entire continuously walled end of the chamber, a sheathing of spaced slat assemblies 35 to shade and maintain the chamber wall in cooled and protected condition.

Ordinarily in closed-wall induced draft towers the tendency of the fan is to draw the air stream in an upward course of flow predominately confined to a more or less central portion of the cooling chamber. The result is a condition of relatively high air velocity and more effective water cooling within central portions of the chamber, and diminishing air velocity and attendant drop in water cooling efficiency toward the sides of the chamber. Adjacent the side wall of the chamber, or opposite side walls in the double air inlet type of tower, the air may have no appreciable velocity, and it may even assume negative flow characteristics in eddying downward along the walls of the chamber. The invention contemplates the placement of air-directive baffles or decks directly within the cooling chamber between the inlets 19 in locations and arrangements assuring air distribution within the entire cross-sectional area of the chamber that will be productive of substantially uniform water cooling conditions, and substantial uniformity in cooling of the air itself in rising within different sections of the chamber.

Generally speaking, the purposes of the invention in this respect are accomplished preferably by directing downwardly succeeding and increasing portions of the air inlet stream, progressively increasing distances toward the center or opposite side of the chamber. For this purpose the top portion of the entering air may be caused to impinge against the inclined decks or baffles 37 which direct the air, as indicated by the arrows, upwardly within the outer portions of the chamber adjacent the side walls 12, thereby relieving conditions of inadequate air flow within the outermost or side portions of the chamber. Below baffles 37 are horizontally disposed baffles 38 between which the air enters and is conducted progressively increasing distances toward the interior of the chamber as illustrated. These baffles may be regarded as forming horizontal air ducts carrying predetermined portions of air to the various sections of the tower. Baffles 38 may take the form of the well-known bowed decks comprising vertically spaced and oppositely bowed slats 39 arranged in relatively staggered positions. Toward the bottom of the chamber the spacing at 40 between decks may be increased to facilitate passage of air to the inner locations within the chamber.

It will be observed that in the particular deck arrangement in Fig. 1, the uppermost deck 38 at the side directs the entering air above it across one section of the chamber. Immediately below this deck are two rows of decks directing a greater quantity of the entering air across two sections of the chamber. Below these decks are three lower rows, three decks to the row, which direct a still greater proportion of the entering air across three sections of the chamber. At the bottom of the chamber a still larger proportion of the entering air is directed above and below the deck course 38a to the opposite side of the chamber containing the decks 38b.

Beyond the inner ends of the horizontal deck courses 38 may be placed the inclined baffles 41 in the form of slatted decks, which divert and direct each air stream flowing transversely between the decks 38, 38a and 38b, upwardly within the cooling chamber. The result is that the total air being taken in through the inlets 19, in effect, is divided successively into more or less separate streams of downwardly increasing quantities of air, which are conducted increasing distances transversely within the chamber and then directed upwardly by the baffles 37 and 31, all in a manner tending toward uniform water cooling in the several sections of the chamber, and uniform cooling of the air as it rises through the deck and baffle assemblies.

A further important advantage is gained through the use of the described baffle system of large total surface area within the bottom portion of the chamber between the air inlets, in that such baffles serve not only to direct and distribute the air, but also to present water cooling surface areas of such magnitude as to greatly reduce and minimize the amount of filling or decks required in the upper portion of the chamber above the air inlets. The important particular result is a substantial reduction in the necessary height of the tower and pumping costs for water going to the distributing system 16. Thus in a tower designed substantially as shown in Fig. 1, the surface areas of the baffle decks between the air inlets may be sufficiently great to obviate the necessity for additional decks within the chamber above the inlets. Therefore, the height of the tower may be reduced at least to the extent of that portion normally required for the accommodation of cooling decks within the upper interior of the chamber.

Figure 2:
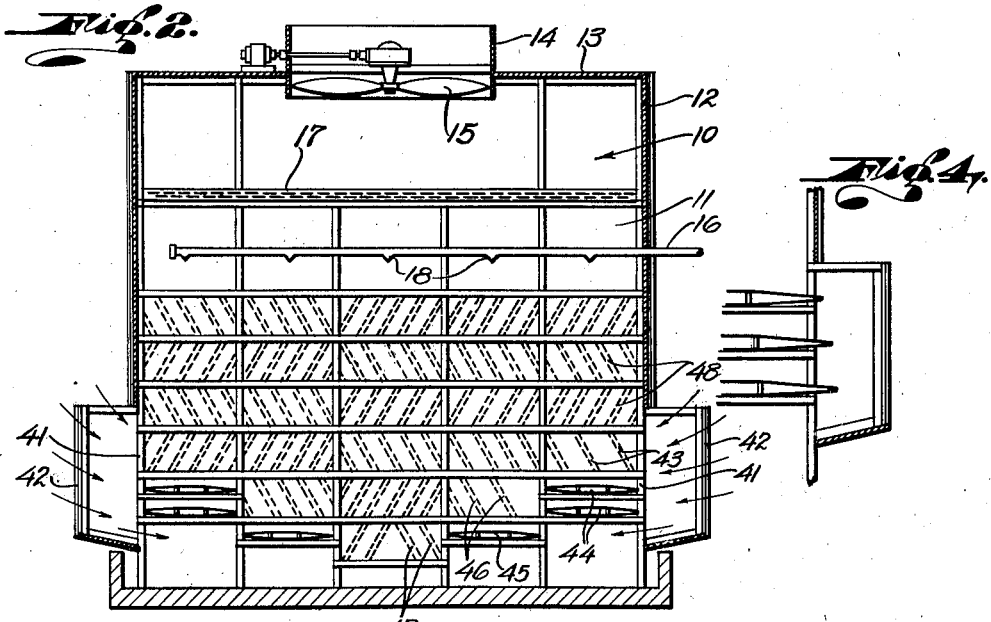
Fig. 2 is a sectional view showing another similar embodiment of the invention.

Fig. 2 shows a double air inlet tower of somewhat reduced width into which the air is drawn through inlets 41 of less vertical extent, and employing opposite each inlet a single baffle assembly 42, as and for the purposes previously described. An upper portion of the entering air may be directed upwardly within the outer zones of the chamber by baffle decks 43, and other portions of the air conducted above and between baffle decks 44 and 45 progressively increasing distances toward the center of the chamber, thence to be deflected upwardly by baffle decks 46 and 47. Water filming surfaces above these decks and baffles may be afforded by any suitable type of filling, for example the slatted decks 48 in oppositely inclined arrangement as illustrated. Here the filling 48 is shown to extend above the inlets 41, although from the foregoing it will be understood that by virtue of the extensive cooling surface area afforded by the baffles and decks within the bottom portion of the chamber, the vertical extent of the filling above may be materially reduced below that normally required.

In Figs. 1 and 2 the decks 38 and 44 are shown to be contained entirely within the cooling chambers. The invention also contemplates the use of baffle means projecting outwardly through the inlets 19 and 14 to divert into the chamber successive portions of the downwardly flowing air stream entering the inlets. Such baffle means may take the form of extensions at the ends of the decks 38 and 41, or the decks themselves shifted outwardly uniform or varying distances through the air inlet, as illustrated in Fig. 4. The air diverting effect of the decks in this arrangement, as well as where the decks are entirely contained within the chamber, is made particularly advantageous by reason of the initial velocity and flow direction given the air by reason of the baffle assemblies 19, 20 and 42.

I claim:

1. In an induced draft cooling tower having continuous walls forming a vertically extending chamber, an air inlet in a lower side wall of the chamber, apertured filling decks within the chamber, and means for passing water downwardly over said decks; the improvements comprising a vertically extending apertured baffle spaced at its upper end from the chamber wall at the outside of said inlet and causing air to flow downwardly and inwardly therethrough into the chamber, a fan at the top of the chamber operating to draw the entering air upwardly and inwardly from the inlet, said fan being offset from the transverse center of the chamber toward the inner side thereof opposite said inlet, so that the induction of air from the chamber is concentrated toward said inner side thereof from the transverse center of the chamber, and means closing the top portion of the chamber about said fan.

2. In an induced draft cooling tower having continuous walls forming a vertically extending chamber having a closed inner side, an air inlet in a lower side wall of the chamber, apertured filling decks within the chamber, and means for passing water downwardly over said decks; the improvement comprising a fan at the top of the chamber operating to draw air upwardly therethrough from said inlet, said fan being offset from the transverse center of the chamber toward said closed side thereof opposite said inlet so that the induction of air from the chamber is concentrated toward said inner side thereof from the transverse center of the chamber, baffle means within the lower portion of the chamber opposite said air inlet and serving to divide and distribute the entering air across the chamber in quantities increasing toward the interior of the chamber away from said inlet, and means closing the top portion of the chamber about said fan.

3. In an induced draft water cooling tower, walls including a vertically extending closed wall at substantially the transverse center of the tower, said wall forming a pair of vertically extending chambers at opposite sides of said closed wall, air inlets only in the lower outside walls of said chambers, means for passing water downwardly through said chambers, fan means at the top of the tower and operating to draw air upwardly through said chambers from said inlets, and means closing the top portion of the chamber about the fan means, said fan means being offset from the transverse centers of said chambers toward said closed walls.

4. In an induced draft water cooling tower, walls including a vertically extending closed wall at substantially the transverse center of the tower, said walls forming a pair of vertically extending chambers at opposite sides of said closed wall, air inlets only in the lower outside walls of said chambers, means for passing water downwardly through said chambers, fan means at the top of the tower and operating to draw air upwardly through said chambers from said inlets, and means closing the top portions of the chambers about said fan means, said fan means comprising a pair of fans one for each chamber, offset from the transverse centers thereof toward said closed wall so that the induction of air from each chamber is concentrated toward the inner side thereof from its transverse center.

JAMES G. DE FLON.